United States Patent [19]

Pendleton et al.

[11] Patent Number: 4,681,729

[45] Date of Patent: Jul. 21, 1987

[54] MONITORING TEMPERATURE WITHIN A VESSEL

[75] Inventors: Eric Pendleton, Culcheth; Karl A. Roberts, Warrington; Alan Murray, Roby, all of England

[73] Assignee: National Nuclear Corporation Limited, London, England

[21] Appl. No.: 731,035

[22] Filed: May 6, 1985

[30] Foreign Application Priority Data

May 21, 1984 [GB] United Kingdom ............... 8412982

[51] Int. Cl.⁴ ................... G21C 17/00; G01K 13/02
[52] U.S. Cl. ................................. 376/247; 374/163; 374/176; 374/177
[58] Field of Search ............... 376/245, 247; 374/163, 374/176, 177

[56] References Cited

U.S. PATENT DOCUMENTS

| | | | |
|---|---|---|---|
| 3,107,531 | 10/1963 | Stevens | 374/176 |
| 3,846,795 | 11/1974 | Jones | 376/245 |
| 3,848,466 | 11/1974 | Dial et al. | 374/163 |
| 4,319,958 | 3/1982 | Fica et al. | 376/247 |
| 4,576,781 | 3/1986 | Duncombe et al. | 376/247 |

FOREIGN PATENT DOCUMENTS 2025621  1/1980  United Kingdom ............... 376/247

Primary Examiner—Salvatore Cangialosi
Attorney, Agent, or Firm—William R. Hinds

[57] ABSTRACT

A vessel for the storage and monitoring of nuclear fuel materials incorporates a device (12) within its interior for providing an externally detectable signal indicating whether any temperature rise has occurred. The device (12) comprises a magnet (32) attracted towards a boundary wall (11) of the vessel and maintained in that position by a temperature-sensitive element such as a thermal link (38). The magnet (32) is subjected to an oppositely directed force by a spring (30), which is effective to drive the magnet (32) away from the wall (11) in the event of a substantial temperature rise within the vessel thereby producing an externally detectable change in magnetic flux.

11 Claims, 9 Drawing Figures

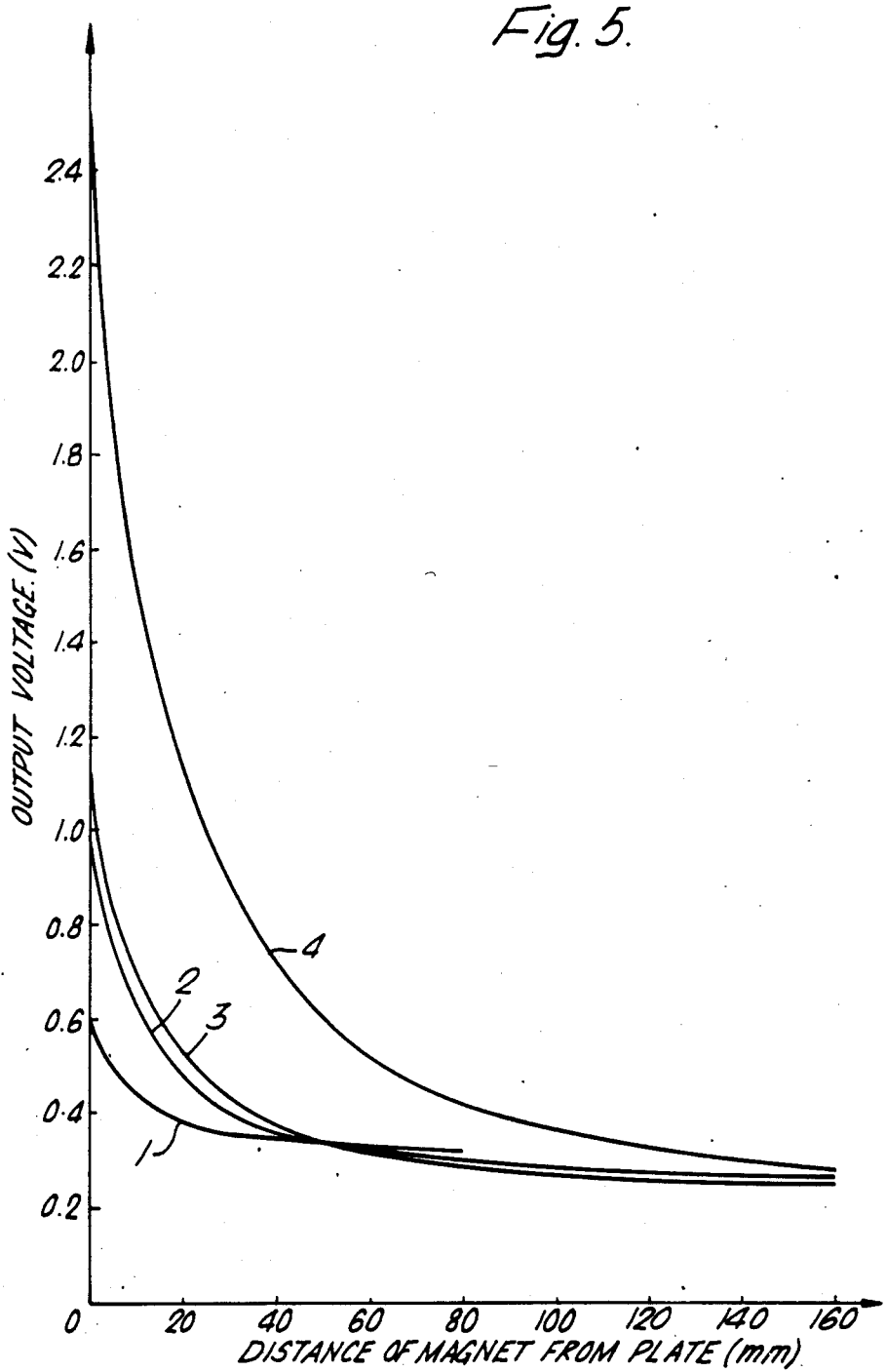

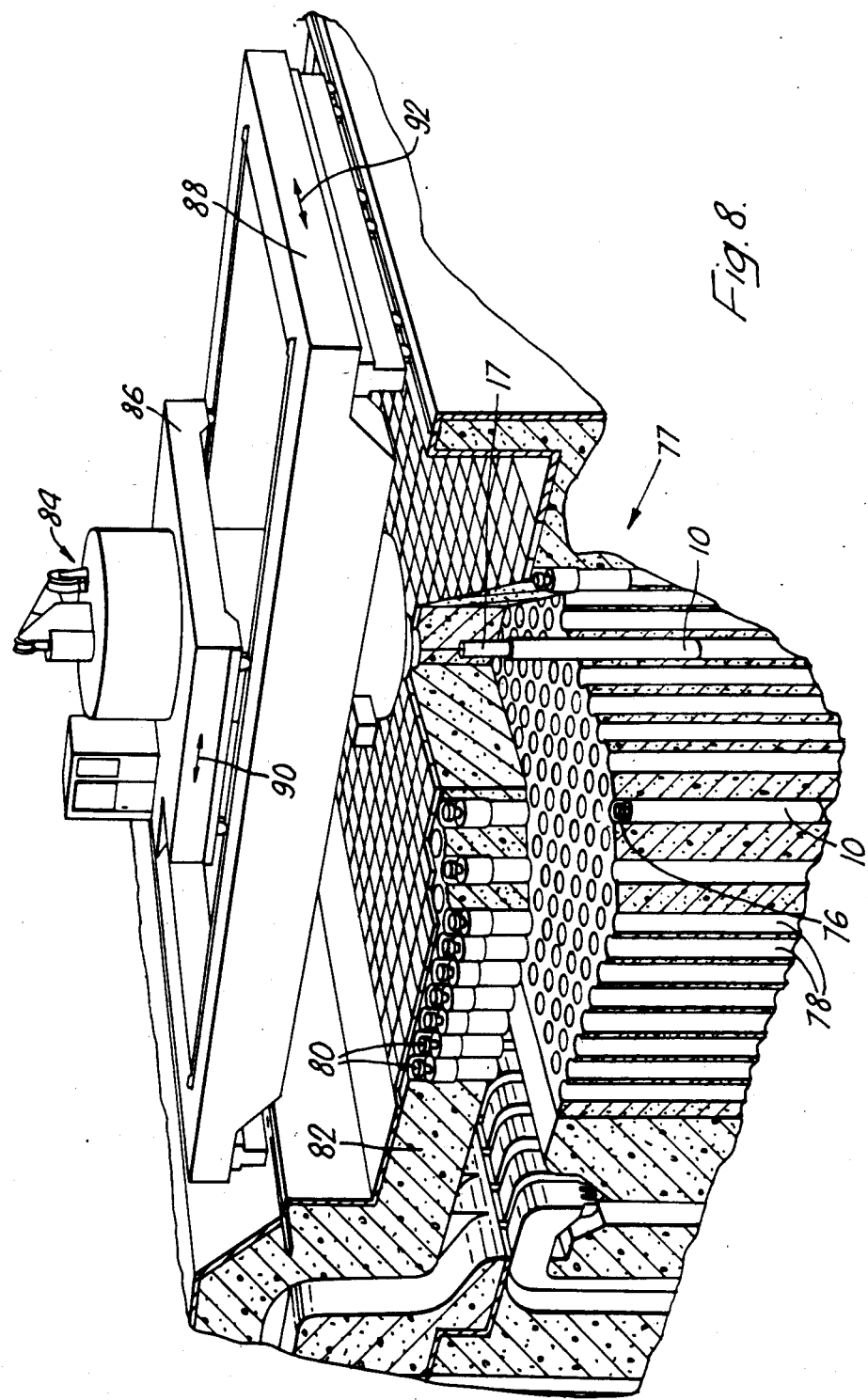

MONITORING TEMPERATURE WITHIN A VESSEL

BACKGROUND OF THE INVENTION

This invention relates to the monitoring of temperature within a vessel, particularly vessels used for the long term storage of or transfer of nuclear fuel materials.

In detecting outside a vessel a change in the temperature inside the vessel it is known to use a temperature probe to measure the temperature of the external surface of the vessel; to use an infra-red detector responsive to the surface temperature of the vessel; to receive outside the vessel radio signals from a temperature detection system in the vessel.

The suitability of these known methods is in doubt especially in terms of long term storage of nuclear fuel materials.

FEATURES AND ASPECTS OF THE INVENTION

According to the invention there is provided a vessel provided internally with a device for enabling external detection of temperature changes within the vessel, said device comprising a permanent magnet, means mounting the magnet within the vessel for movement towards and away from a boundary wall of the vessel, means having sufficient magnetic coupling with the magnet to restrain the magnet against movement away from a predetermined position with respect to said boundary wall of the vessel, and temperature-responsive means for urging the magnet away from said predetermined position whereby, in the event of a substantial rise in temperature within the vessel, the latter means becomes effective to move the magnet relative to the boundary wall to vary the magnetic field strength detectable by detector means located on the external side of said boundary wall.

The vessel may be open or closed. The vessel may for example be a nuclear fuel transport flask or a canister for nuclear fuel or a containment vessel for a reactor core.

The detector means may comprise a Hall effect transducer responsive to the magnetic field produced by the permanent magnet outside the container.

The detector means may alternatively comprise means for generating a time varying magnetic flux in said boundary wall of the vessel which interacts with the magnetic flux of the permanent magnet, and means for sensing magnetic flux external to said boundary wall.

The temperature responsive means may include a thermal link so that on breaking of the link the permanent magnet is moved relative to said boundary wall by spring means.

The link may be broken by an increase in temperature above a predetermined value or by corrosion.

DESCRIPTION OF THE DRAWINGS

The invention may be performed in various ways and one specific embodiment with possible modifications will now be described by way of example with reference to the accompanying diagrammatic drawings, in which:

FIG. 5 is a graph showing variations in output from a detector head;

FIG. 8 is a schematic partly broken away perspective view illustrating a storage facility.

DESCRIPTION OF PREFERRED EMBODIMENTS

Figure 1:
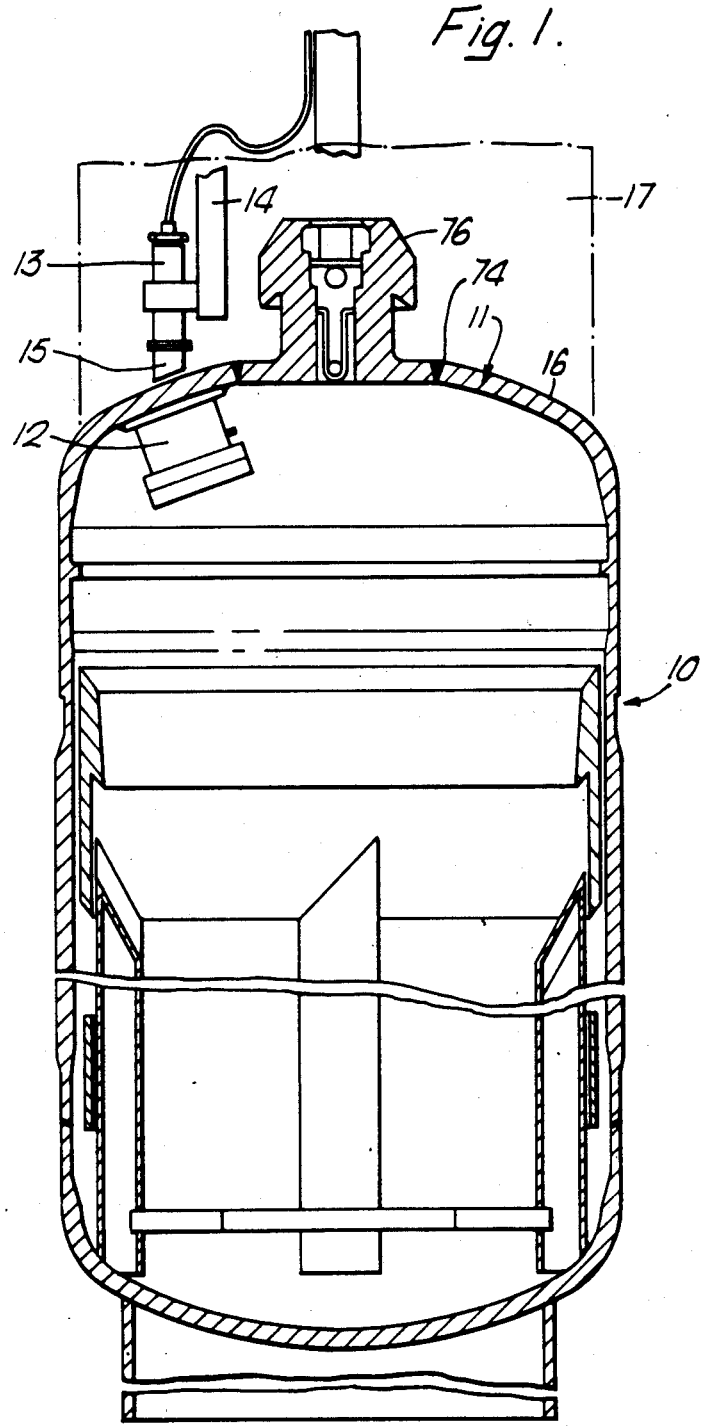
FIG. 1 is an axial section through a storage container with a detector.

Referring to FIGS. 1 to 4, a metal container 10 adapted to have an internal pressure greater than atmospheric has an upper wall 11 to the inside of which is fixed a detector 12. A detector head 13 is mounted on structure 14 forming part of grab 17 and has a spring-loaded nose 15 for bearing against the wall 11 and ensuring that the head 13 is properly located with respect to the external surface 16 of the wall 11 opposite the detector 12. A grab or other means is shown schematically at 17 and is adapted to rotate the head through 360° around the axis of the stationary container so that the wall 11 is swept by the head. As described with reference to FIG. 8, the grab 17 may form part of a container handling machine in a storage and monitoring facility.

The detector unit 12 comprises a generally tubular member 18 having at one end an outward flange 19 welded to the inner surface 20 of the wall 11. This weld is not necessarily in an air-tight manner. The response time of the device could be improved by allowing natural convection to the thermal strip, and possibly by perforating the body 18. In some cases welding may not be possible as this would cause mechanical deterioration and possible failure of the thermal link by conduction from the weld along the bar 36. The internal surface 21 of the member 18 is stepped to provide an annular should 22 intermediate the ends of the member, the outer end of which has bolted thereto an annular protective cover 23 providing a central mouth or inlet aperture 24. The surface 21 is stepped also adjacent the plate 23 to provide another shoulder 25. A circular retaining plate 26 has its annular outer marginal portion in engagement with the shoulder 25. An axial tube 28 extends through the plate 26 having a flange 27 abutting the plate 26 and extends towards the wall 11 passing through a central aperture in an annular plate 29 which abuts the shoulder 22 and through a compression spring 30 which extends between the plate 26 and the plate 29 to hold the plate 29 against the shoulder 22. The tube 28 at its end nearer the wall 11 has a threaded portion of reduced section which engages in a central passage in the base 31 of a horseshoe permanent magnet 32 having arms 33 with ends 34 engaging surface 20. A nut 35 holds these parts together.

The container and, in particular, the wall 11 may be fabricated from a ferromagnetic material such as mild steel in which case the wall 11 in effect acts as a keeper for the magnet 32. Alternatively the container may be fabricated from a magnetically characterless metal such as a stainless steel. In the latter case, a keeper may be provided if desired and, as shown in FIG. 3A, it may be secured to, or form part of, the tubular member 18, the keeper being depicted by reference numeral 70. Where the wall 11 acts as a keeper or where a keeper 70 is provided, direct contact between the poles of the magnet 32 and the keeper may be undesirable because of the affects of residual magnetism in the keeper and consequently some form of non-magnetic spacer (not shown) may be interposed between the magnet and the keeper.

A bar 36 is fixed to surface 20 between arms 33 and its ends are received in notches 37 in the inner surface 21 at one end thereof (FIG. 4) to resist rotation. A thermal link 38 is fixed to the bar 36, extends along the tube 28 and is secured at its other end to a block 39 in the end of the tube 28 and having an end portion overlying the flange 27 so that in the datum position shown in FIG. 3 the spring 30 is compressed, plate 29 engages shouler 22 and plate 26 engages shoulder 25.

If the thermal link 38 breaks, for example due to corrosion or a rise in temperature above the melting point of the material of the link, the spring 30 moves the plate 26 into engagement with cover plate 23 (see FIG. 2) thus moving the magnet 32 away from the wall 11.

Figure 2:
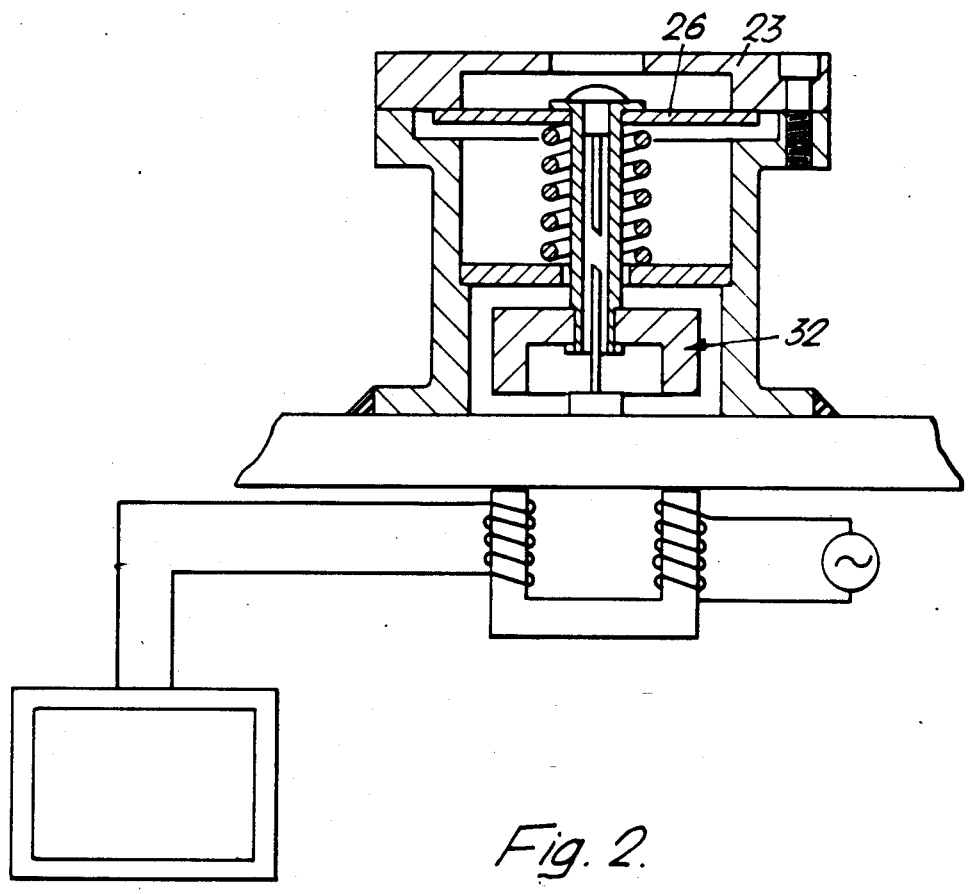
FIG. 2 is an axial section through the detector in one condition.
Figure 3:
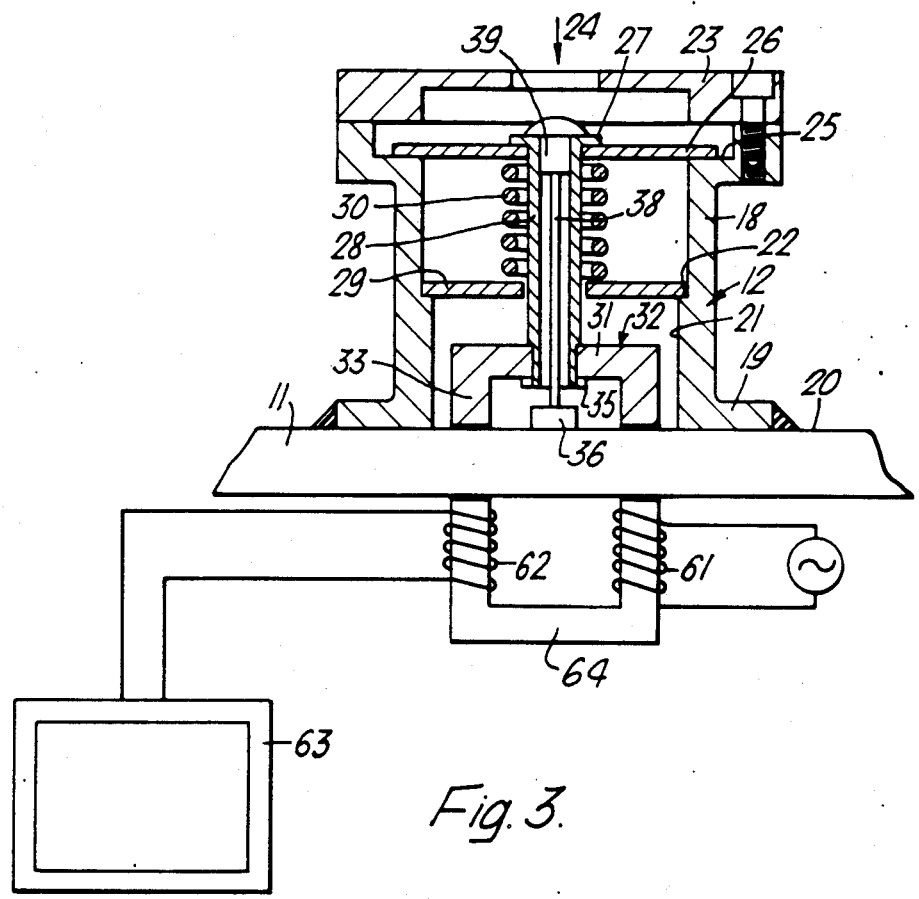
FIG. 3 is a view similar to FIG. 2 with the detector in another condition.
Figure 3A:
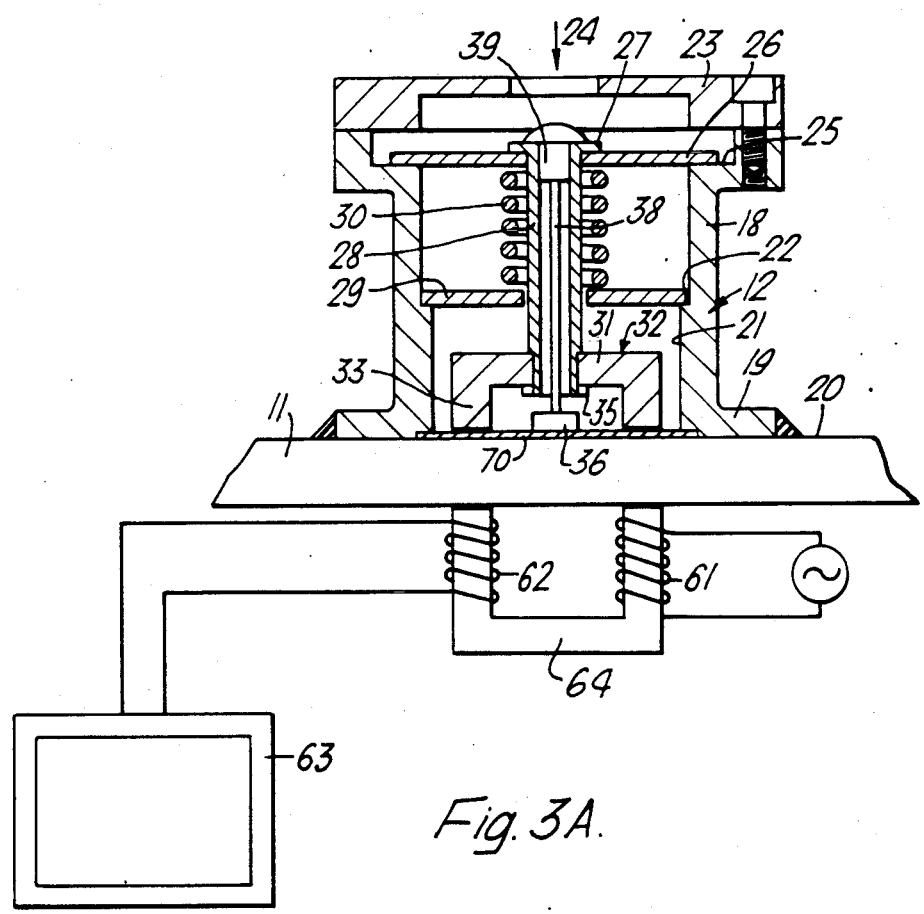
FIG. 3A is a fragmentary view similar to FIG. 3 but showing a modification.
Figure 4:
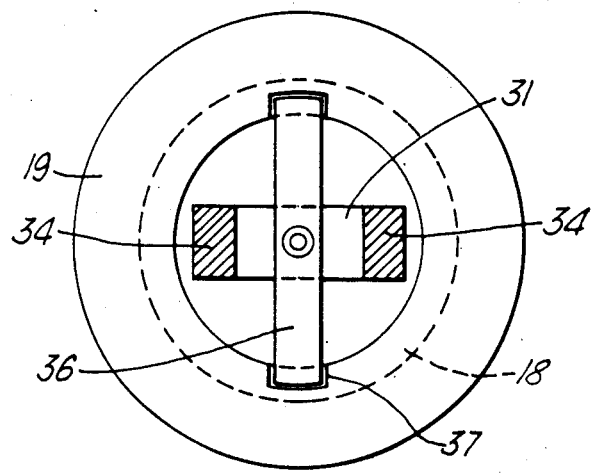
FIG. 4 is a view from one end of the detector.

When the magnet 32 is in the FIG. 3 position, the magnetic field induced in the wall 11 and the external or stray magnetic field outside the wall 11 are greatest, and are greater than with the magnet 32 in the FIG. 2 position. This change of magnetic flux is detected by a detector head 13 and the magnetic flux may be displayed on a fluxmeter connected to the head 13. The fluxmeter may take the form of a voltmeter displaying a voltage directly proportional to the magnetic flux. The voltmeter may be of digital form ("magnet present" or "magnet absent") but in suitable circumstances an analogue voltage reading could be displayed so as to measure temperature directly.

The container 10, or at least the wall 11, may be of diamagnetic, paramagnetic or ferromagnetic material. The magnet 32 can take various forms and configurations, eg a bar magnet or magnets. The bar magnet could be disposed parallel to the wall 11, or at right angles to the wall 11 with the outer end connected to the rod 28. The bar magnet can be disposed either perpendicular or parallel to the wall 11 depending on the desired characteristics. With the bar magnet parallel to the wall the effect is similar to the horse shoe magnet, whilst with the magnet perpendicular to the wall the pull-off force is reduced but the measured leakage flux is increased. Preferably the magnet has both of its poles presented towards the wall 11 as shown in the illustrated embodiment, the poles being spaced apart in the direction of scan by the detector head 13 which assists precise location of the magnet since the two poles will give rise to opposite flux changes as the detector head scans across the magnet 32.

Figure 7:
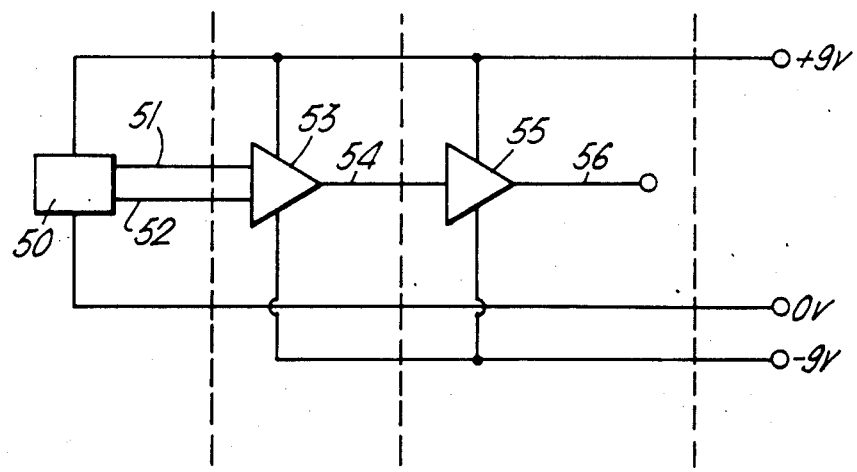
FIG. 7 is a circuit.

The detector head 13 responsive to the change in magnetic flux preferably comprises a Hall effect transducer, preferably incorporating a suhl effect semiconductor, which is responsive to the leakage flux outside the wall 11. FIG. 7 shows a suitable arrangement in which a linear Hall effect device 50 has an output on lines 51, 52, connected to a differential amplifier 53 which has an output on line 54 to an inverting amplifier 55 including a zeroing circuit and an output on line 56 leading to the fluxmeter (voltmeter). A battery power supply is used.

Figure 6:
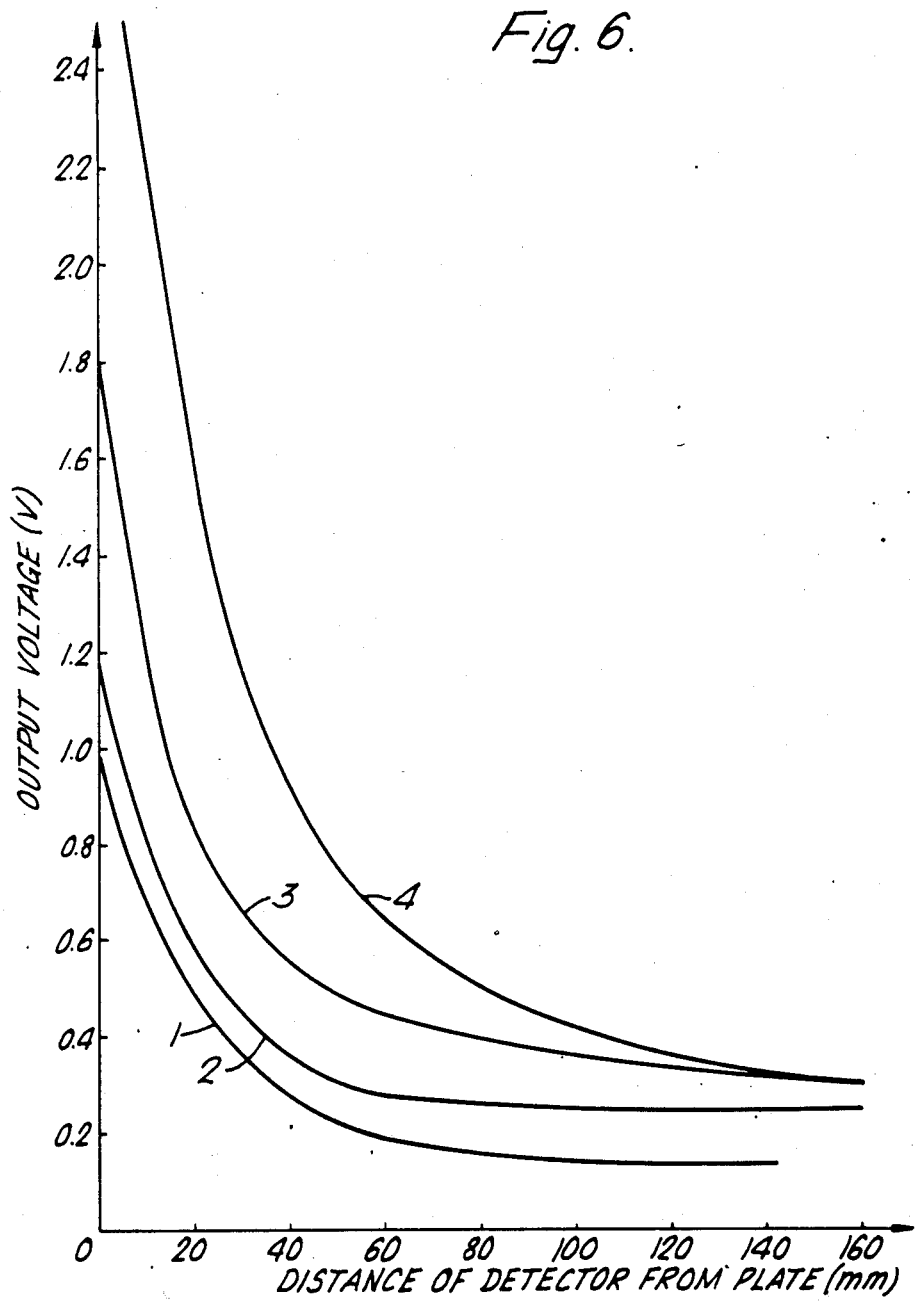
FIG. 6 is a graph showing further variations in output.

FIG. 5 shows the voltage output on line 56 for differing distances of four different magnets from the surface 20, and FIG. 6 shows the voltage output on line 56 for varying distances of the Hall effect device 50 from the surface 16 with the respective magnet engaging the surface 20.

Two detectors and associated detector heads could be used to reduce the risk of overall failure. To avoid dissimilar welds, the member 18 is of the same material as the container wall 11, eg mild steel. The container 10 may for example be a canister for fuel for a nuclear reactor.

In one arrangement applicable to situations in which the container is fabricated from a magnetically soft material (such as mild steel) or where a separate keeper is employed as in FIG. 3A, the detector detects the unidirectional magnetic flux within the wall 11 by superimposing a time varying flux onto the unidirectional flux and measuring the resultant interaction. Ideally the resultant flux should be measured within the wall 11 but, since this is not practicable, it is proposed to measure the interaction in the secondary iron circuit by a use of a search coil.

It is considered that this method will have greater sensitivity since it is measuring the flux in the wall directly rather than the associated leakage flux. The development of the alternative method may permit the device to be used as a temperature transducer as opposed to a temperature sensor.

The interaction in wall 11 is due to the induced ac magnetic flux interacting with the steady state flux of the permanent magnet in a common limb of an iron circuit. It can be compared to the interaction of an alternating voltage and a dc voltage through a common branch of a circuit which can be theoretically analysed using the classical "superposition theorem". One possibility is shown in FIGS. 2 and 3, the detector head 13 is in the form of a coil 61 on one arm of a core 64 and energized from an AC source and producing an alternating magnetic field in wall 11, which field interacts with the magnetic field in the wall 11 from the magnet 32. A sensor or search coil 62, also would on core 64, responds to changes in magnetic field outside the wall 11 due to the interacting magnetic fields in the wall 11 and has an output connected to a detector unit 63.

The output from the sensor coil 62 is an alternating voltage whose magnitude and wave shape are dependent on the magnitude of the unidirectional flux produced by the permanent magnet 32. There would be a secondary effect of a small induced voltage due to the movement of the permanent magnet. This is not considered to be of any significance because of its small magnitude and the fact that the detector may not necessarily be present at the moment of operation (e.g. the detector may be mounted on the grab of a crane). The detector unit 63 may comprise a sensitive AC voltage detector, an amplifier, a scaler, and a display device.

Instead of a fusible or breakable thermal link, the parts 36, 39 may be connected by a bimetal component, eg. a strip or bellows, whose expansion on rise of temperature allows the plate 26 to move and with it the magnet 32.

The example described uses a fusible thermal link in conjunction with the spring to reposition the permanent magnet. This has the fundamental feature that once it has operated it cannot be reset without replacing the fusible link. This can be an advantage or disadvantage depending on the application. Other, resettable, alternatives would utilise bimetallic strips, gas contained within a bellows, expansion and contraction of suitable metals or waxes (as in a combustion engine CW thermostat) to reposition the permanent magnet. Possible transducers would include future developments in materials science such as memory alloys operating at cryogenic temperature.

The container shown in FIG. 1 is intended for the long term storage of nuclear fuel materials in the form of, for example, fast reactor fuel sub-assemblies. The sub-assembly is introduced into the container via opening 74, a valve and handling unit 76 is then welded to the container and the container is pressurised via the valve unit to a pressure above atmospheric pressure. The container can thereafter be loaded into a storage facility such as that shown in FIG. 8. The facility comprises a vault 77 in the form of an array of container channels 78 which may comprise steel tubes supported in a concrete structure and accessible via removable plugs 80 in a shield structure 82. A container handling machine 84 is provided above the shield structure 82 and is mounted on carriages 86, 88 moveable in mutually orthogonal directions 90, 92 to enable the grab 17 of the machine to be moved across the array. In FIG. 8, the machine is shown lowering a container 10 into a channel 78, the grab being engaged with the valve and handling unit 76.

The grab 17 includes a sniffing device (not shown) as well as detector head 13, the sniffing device being operable to detect for example fission gas release via the valve unit 76. Thus, in use, the machine 84 may be used to periodically examine each container 10 stored in the vault by means of detector head 13 and for fission gas leakage.

In an alternative embodiment, the container may be constituted by a transport vessel, known as a bucket, for use in transporting fuel sub-assemblies from the interior of the liquid metal cooled fast breeder reactor to a storage facility, the bucket being filled with liquid metal coolant, eg. sodium, to prevent excess temperatures arising. One or more detector heads, for example of the form shown in FIGS. 2 and 3, may be located along the path of travel of the buckets so that the internal temperature may be monitored at critical stages in the transfer procedure.

We claim:

1. A vessel provided internally with a device for enabling external detection of temperature changes within the vessel, said device comprising a permanent magnet, means mounting the magnet within the vessel for movement towards and away from a boundary wall of the vessel, means having sufficient magnetic coupling with the magnet to restrain the magnet against movement away from a predetermined position with espect to said boundary wall of the vessel, and temperature-responsive means for urging the magnet away from said predetermined position such that, in the event of a substantial rise in temperature within the vessel, the latter means becomes effective to move the magnet relative to the boundary wall to vary the magnetic field strength detectable by detector means located on the external side of said boundary wall.

2. A vessel as claimed in claim 1 in which said vessel boundary wall is composed of a magnetically soft material and constitutes said restraining means, and in which the urging means develops sufficient power to move the magnet away from said boundary wall in the event of a substantial rise in internal temperature.

3. A vessel as claimed in claim 1 in which a magnetically soft element determines said predetermined position, said element being fixed against movement with respect to said boundary wall and constituting said restraining means, and in which the urging means develops sufficient power to move the magnet away from said element in the event of a substantial rise in internal temperature.

4. A vessel as claimed in claim 1 in which said urging means includes a thermal link which, while intact, restrains the urging means from exerting its urging force on the magnet but breaks in response to substantial temperature rise and thereby renders the uring means effective to move the magnet away from said predetermined position.

5. A vessel as claimed in claim 1 in which said urging means includes a bimetallic component.

6. A vessel as claimed in claim 1 in which said boundary wall is constituted by a top wall portion of the vessel.

7. A handling and monitoring facility for spent nuclear fuel material comprising at least one vessel as claimed in claim 1, and detector means external to the vessel and responsive to changes in magnetic flux caused by movement of said permanent magnet away from said predetermined position.

8. A facility as claimed in claim 7 in which said detector means comprises a Hall effect transducer.

9. A facility as claimed in claim 7 in which said detector means is operable to induce a time-varying magnetic flux in said vessel wall for superimposition on the steady state magnetic flux of the permanent magnet in said boundary wall or said element and to measure changes resulting from movement of the magnet away from said wall.

10. A facility as claimed in claim 7 in which a plurality of said vessels are provided, said vessels each incorporating a device as aforesaid and being arranged in an array such that said vessel boundary walls are all accessible at one face of the array, and in which means is provided for moving the detector means from one vessel to another whereby all of the vessels can be periodically monitored.

11. A facility as claimed in claim 10 in which said moving means is operable to bring the detector means into close proximity with said boundary wall of each vessel and scan the detector means over said boundary wall.

* * * * *